F. WEINMAN.
SPRING WHEEL.
APPLICATION FILED JUNE 16, 1915.

1,193,325.

Patented Aug. 1, 1916.

Inventor
F. Weinman.

By
Attorneys

UNITED STATES PATENT OFFICE.

FRED WEINMAN, OF ROUND VALLEY, NEBRASKA.

SPRING-WHEEL.

1,193,325. Specification of Letters Patent. Patented Aug. 1, 1916.

Application filed June 16, 1915. Serial No. 34,439.

*To all whom it may concern:*

Be it known that I, FRED WEINMAN, a citizen of the United States, residing at Round Valley, in the county of Custer and State of Nebraska, have invented certain new and useful Improvements in Spring-Wheels, of which the following is a specification.

This invention has relation to wheels and especially to the type designed for vehicles, the purpose being the provision of a wheel embodying a yieldable rim which neutralizes shock and absorbs vibration, with the result that riding is made comfortable and the wear upon the vehicle and adjunctive parts, such as propelling means, reduced to the smallest amount possible.

The invention consists of a wheel embodying a rim and yieldable connections between the rim and felly of the wheel proper, such yieldable connections providing for movement of the rim and serving to compensate for shock and vibration.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Figure 1:
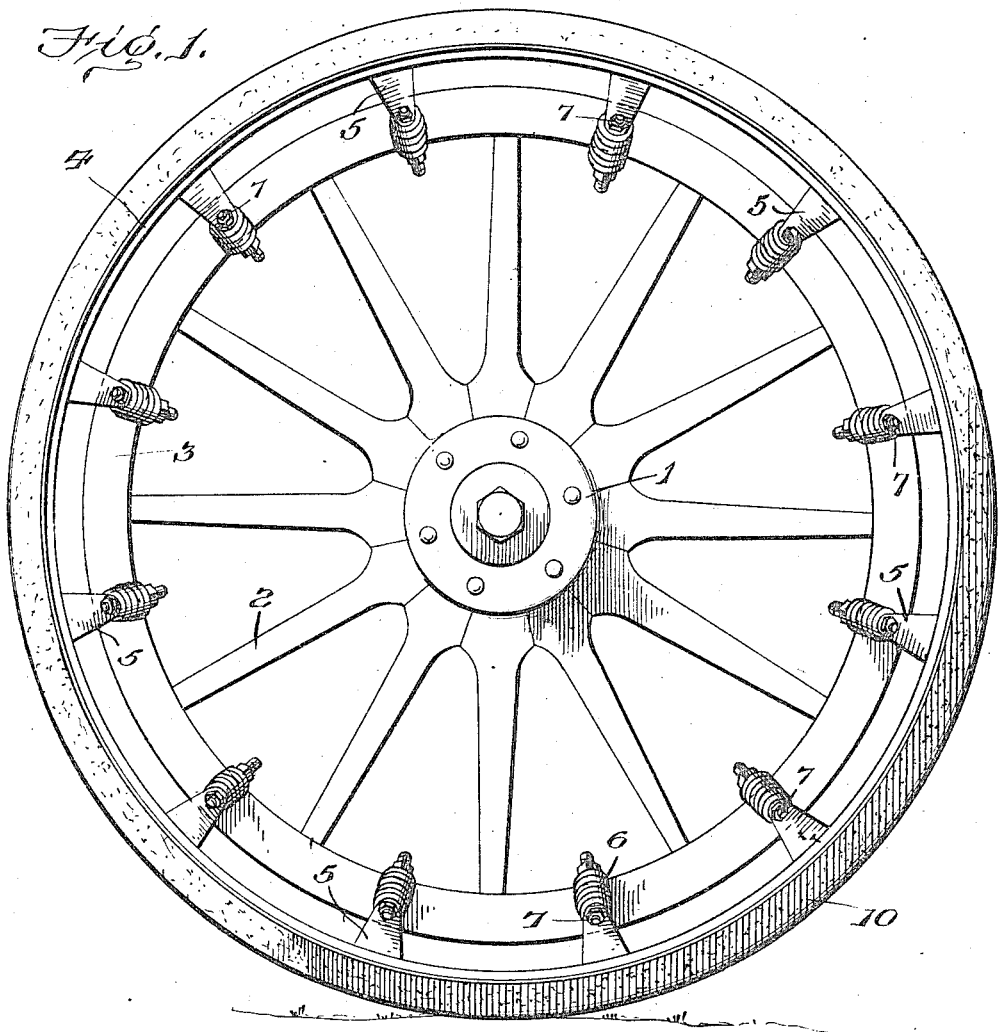
Figure 2:
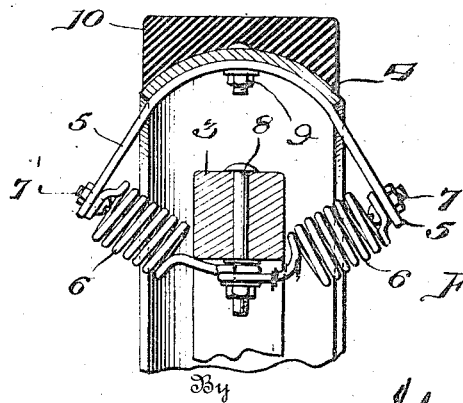

Referring to the drawings, Figure 1 is a side view of a vehicle wheel embodying the invention; Fig. 2 is an enlarged transverse section of the outer or rim portion of the wheel.

Corresponding and like parts are referred to in the following description and indicated in all the views of the drawings by the same reference characters.

The wheel embodies a hub 1, spokes 2, felly 3, an outer yieldable rim 4 and yieldable connecting means between the felly 3 and rim 4.

In the preferred form illustrated in Figs. 1 and 2 a plurality of bow springs 5 are attached at a middle point to the rim 4 and face inward with their side members extending equally upon opposite sides of the felly 3. Coil springs 6 connect the extremities of the bow springs 5 with the felly 3 and are disposed so as to incline outwardly and laterally so as to supplement the action of the bow springs in centralizing and holding the rim 4 in a given position. The ends of the coil springs 6 are formed with eyes through which suitable fastenings pass for connecting the springs to the bows 5 and felly 3. The outer ends of the springs 6 are connected to the extremities of the bows 5 by means of bolts 7. The inner ends of the springs 6 overlap and are connected to the felly 3 by means of bolts 8, the latter passing radially through the rim 3. The springs upon one side of the plane of the wheel act in opposition to the springs upon the opposite side of the wheel, thereby holding the rim 4 in the plane of the wheel at all times while at the same time admitting of such rim yielding to absorb shock and vibration.

In the preferable form of the rim 4, the same consists of a metallic band of approximately half round form in transverse section and arranged with its convex side facing outward and its concave side facing inward and receiving the bow springs 5 which are attached thereto by means of suitable fastenings 9. A tire 10 of rubber or other yieldable material is fitted to the rim 4 and may be secured thereto in any manner.

Having thus described the invention, what is claimed as new is:—

1. The combination with a wheel including a felly and spokes, of a concavo-convex rim spaced from the felly, substantially U-shaped flat springs rigidly secured to the concave face of the rim, said flat springs having their free ends extended laterally beyond the opposite sides of the rim, pins secured to the felly between the free ends of the arms of the springs, and coil springs secured to the inner faces of the flat U-shaped springs and extending over the inner face of the felly for engagement with the pins.

2. The combination with a wheel including a felly and spokes, of a concavo-convex rim spaced from the felly, substantially U-shaped flat springs having their intermediate portions rigidly secured to the convex face of the rim and their free ends reduced and extended laterally beyond the adjacent side edges of the rim, pins extending through the felly and provided with threaded terminals disposed at the inner face of the felly, oppositely inclined coil springs interposed between the free ends of the flat springs and the felly, said springs each having one end thereof provided with an eye bearing against the inner face of the adjacent flat spring and its other end extended over the inner face of the felly and provided with an eye fitting over the threaded end of the adjacent pin, the eyes at the inner ends of the springs being fitted over the threaded ends of the pins in overlapped relation, fastening devices extending through the free ends of the flat springs and engaging the eyes at the outer ends of the coil springs, and fastening devices engaging the threads on the pins and bearing against the overlapping eyes at the inner ends of the springs.

In testimony whereof I affix my signature.

FRED WEINMAN. [L. S.]

Copies of this patent may be obtained for five cents each, by addressing the "Commissioner of Patents, Washington, D. C."